United States Patent
Tsutsumi

(10) Patent No.: US 6,661,935 B2
(45) Date of Patent: Dec. 9, 2003

(54) OPTICAL SIGNAL PROCESSING APPARATUS AND METHOD

(75) Inventor: Makoto Tsutsumi, Hirakata (JP)

(73) Assignee: Murata Manufacturing Co., Ltd., Kyoto (JP)

(*) Notice: Subject to any disclaimer, the term of this patent is extended or adjusted under 35 U.S.C. 154(b) by 8 days.

(21) Appl. No.: 09/897,835

(22) Filed: Jun. 29, 2001

(65) Prior Publication Data

US 2002/0031290 A1 Mar. 14, 2002

Related U.S. Application Data

(63) Continuation of application No. 09/266,527, filed on Mar. 11, 1999, now abandoned.

(30) Foreign Application Priority Data

Mar. 11, 1998 (JP) .............................................. 10-80453

(51) Int. Cl.⁷ .............................................. G02F 1/295
(52) U.S. Cl. ............................ 385/6; 359/280; 359/324
(58) Field of Search ....................... 385/6; 359/280–284, 359/321, 324

(56) References Cited

U.S. PATENT DOCUMENTS

| 3,764,195 A | 10/1973 | Blamk et al. | |
| 4,419,637 A | 12/1983 | Volluet et al. | 333/147 |
| 4,575,179 A * | 3/1986 | Lee et al. | 385/6 |
| 5,307,516 A | 4/1994 | Nomoto | 455/304 |
| 5,347,387 A * | 9/1994 | Rice | 359/152 |
| 5,477,376 A * | 12/1995 | Iwatsuka et al. | 359/283 |

FOREIGN PATENT DOCUMENTS

| EP | 0505040 | 9/1992 |
| JP | 64-88402 | 4/1989 |
| JP | 3-208027 | 9/1991 |

OTHER PUBLICATIONS

Japanese Examination Report dated Jul. 16, 2002, along with an English translation.

* cited by examiner

Primary Examiner—Mark A. Robinson
Assistant Examiner—Alessandro V. Amari
(74) Attorney, Agent, or Firm—Keating & Bennett, LLP

(57) ABSTRACT

An optical signal processing apparatus includes a YIG monocrystal serving as a magnetic body. A microstrip is provided on one main face of the YIG monocrystal, and microwaves are input to the microstrip. In order to input a laser beam into the YIG monocrystal, a semiconductor laser, a first lens, and a polarizer are disposed on the outside of one side surface of the YIG monocrystal with respect to the widthwise direction thereof. In order to detect a laser signal output from the YIG monocrystal, a analyzer, a second lens, and a photo detector are disposed on the outside of the other side surface of the YIG monocrystal with respect to the widthwise direction thereof.

27 Claims, 9 Drawing Sheets

OPTICAL SIGNAL PROCESSING APPARATUS AND METHOD

This is a continuation of Ser. No. 09/266,527 filed Mar. 11, 1999, abandoned.

BACKGROUND OF THE INVENTION

1. Field of the Invention

The present invention relates to an apparatus and method for processing optical signals, and more particularly to an optical signal processing apparatus used as a microwave filter, a TM-TE mode converter, an optical beam scanner, or an electromagnetic field sensor such as a surge current sensor for detecting high-speed surge, as well as to an optical signal processing method used in such an optical signal processing apparatus.

2. Background Art

A conventional optical signal processsing apparatus of one type is disclosed in Tsutsumi, et al., IEICE Transactions, J76-C-1, 114, 1993. FIG. 10 is a schematic diagram of the disclosed optical signal processing apparatus. The optical signal processing apparatus 1 shown in FIG. 10 comprises a YIG (yttrium iron garnet) thin film 2, which serves as a magnetic body, formed on one main surface of a GGG substrate 3. A laser beam generated by a semiconductor laser 4 and having a wavelength of 1.3 μm is input to one side surface of the YIG thin film 2 via a polarizer 5. The input laser beam is output from the opposite side surface of the YIG thin film 2. The output laser beam is received by a Ge photodiode 7 via a analyzer 6 and is then detected by a lock-in amplifier 8. Further, a linear antenna 9 is provided as a transducer on the main face of the YIG thin film 2. Microwaves generated by a microwave oscillator 10 are fed to the antenna 9 via a PIN diode 11 and a GaAs microwave monolithic-IC amplifier 12. Thus, a high frequency magnetic field is excited in the YIG thin film 2. In the optical signal processing apparatus 1, in order to facilitate receipt of signals and increase the SN ratio, the microwave generated at the microwave generator 10 is subjected to amplitude modulation at a frequency of, for example, 1000 Hz, performed by the PIN diode 11 and a low frequency oscillator 13. Therefore, the high frequency magnetic field generated by the microwave induces the magneto-optical effect in the YIG thin film 2 or the like, which in turn induces Faraday rotation, and thus the modulated laser signal is detected.

A conventional optical signal processing apparatus of another type is disclosed in C. S. Tsai, et al., Appl. Phys. Lett. 47, 651, 1985. FIG. 11 is a schematic diagram of the disclosed optical signal processing apparatus. In contrast with the optical signal processing apparatus shown FIG. 10, in the optical signal processing apparatus shown FIG. 11, two antennas 9 and 9' each formed of a strip line are provided on the main face of the YIG thin film 2 such that they are separated from each other. One antenna 9 is used for generation of microwaves, and the other antenna 9' is used for detection. In the optical signal processing apparatus shown FIG. 11, a TM-mode optical signal input to the YIG thin film 2 is converted into a TE-mode optical signal by the magneto-optical effect in the YIG thin film 2 or the like.

In each of the above-described optical signal processing apparatuses, a transducer in the form of the antenna 9 is used as means for applying microwaves onto the YIG thin film 2 serving as a magnetic body. Thus, microwaves are generated in a direction perpendicular to the antenna 9, and magneto-static waves (MSW) are excited within the YIG thin film 2 due to the microwaves. Thus, optical modulation or TM-TE mode conversion is performed.

However, in the prior art techniques, since the efficiency in modulating an optical signal by microwaves is low, a high SN ratio cannot be obtained.

Further, in the prior art techniques, the propagation characteristics of microwaves cannot be changed freely. Therefore, manufacturing a filter device having desired filter characteristics has been difficult.

Moreover, according to the prior art techniques, it has been difficult to manufacture a simple electromagnetic field sensor that can cope with high-speed surge current such as current induced by lightning.

SUMMARY OF THE INVENTION

In view of the foregoing, an object of the present invention is to provide an optical signal processing apparatus and method which can improve the SN ratio and the efficiency in modulating an optical signal by microwaves.

In order to achieve the above object, the present invention provides an optical signal processing apparatus in which microwaves are applied to a strip line formed on a magnetic body in order to process an optical signal propagating through the magnetic body.

In the optical signal processing apparatus of the present invention, a magnetic field may be applied to the magnetic body. In this case, the general propagation direction of a light signal within the magnetic body coincides with the application direction of the magnetic field, and the propagation direction of microwaves is substantially perpendicular thereto. Alternatively, the general propagation direction of a light signal within the magnetic body, the application direction of the magnetic field, and the propagation direction of microwaves are perpendicular to one another.

An optical detector may be added to the optical signal processing apparatus of the present invention in order to form a filter. In this case, the optical detector may be selected from the group consisting of a photodiode, a phototransistor, a photoelectric tube, and a photo multiplier.

A TM-TE mode converter may be formed from the optical signal processing apparatus of the present invention.

Also, an optical beam scanner may be formed from the optical signal processing apparatus of the present invention.

Further, an electromagnetic field sensor may be formed from of the optical signal processing apparatus of the present invention.

The present invention also provides an optical signal processing method in which microwaves are applied to a strip line formed on a magnetic body in order to process an optical signal propagating through the magnetic body.

In the optical signal processing apparatus and method of the present invention, ferrite is used for the magnetic body. For example, ferrite having an iron-garnet structure (represented by $M_3Fe_5O_{12}$, where M is a metal or metalloid) such as YIG ($Y_3Fe_5O_{12}$) may be used.

In the optical signal processing apparatus and method of the present invention, a bulk monocrystal or a monocrystalline thin film may be used as the magnetic body.

According to the present invention, the following advantageous effects are attained.

1) The efficiency in modulating an optical signal by microwaves is high, so that a high SN ratio is obtained.
2) Since a high Q value is attained, a narrow band filter characteristic is obtained.
3) A TM-mode optical signal can be efficiently converted into a TE-mode optical signal.

4) There can be performed scanning in which the propagation direction of a light beam is changed.

5) Surge current such as current induced by lightning can be detected at high speed.

BRIEF DESCRIPTION OF THE DRAWING

Various other objects, features, and many of the attendant advantages of the present invention will be readily appreciated as the invention becomes better understood with reference to the following detailed description of the preferred embodiments in connection with an accompanying drawing in which.

DETAILED DESCRIPTION OF THE PREFERRED EMBODIMENTS

Figure 1:
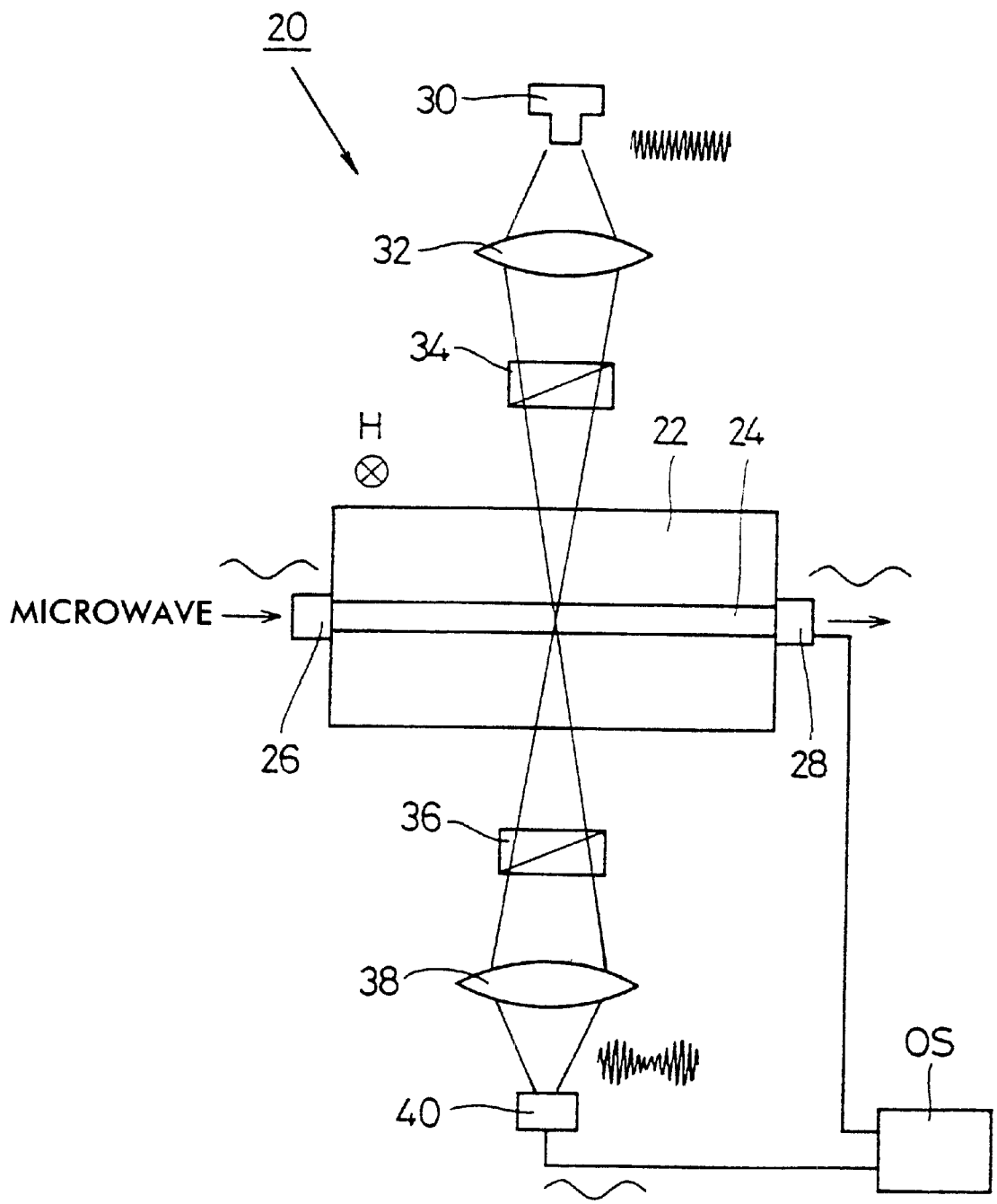
FIG. 1 is a schematic view of an optical signal processing apparatus according to a first embodiment of the present invention.

FIG. 1 is a schematic view of an optical signal processing apparatus 20 according to a first embodiment of the present invention. The optical signal processing apparatus 20 shown in FIG. 1 includes a YIG monocrystal 22 serving as a magnetic body and having a size of, for example, 10 mm×5 mm×1 mm.

A microstrip 24 is provided on one main face of the YIG monocrystal 22 at the widthwise center thereof. The microstrip 24 has a length of 10 mm, a width of 1 mm, and a thickness of 0.1 mm, for example.

A microwave input terminal 26 and a microwave output terminal 28 each formed of a coaxial connector are provided at the opposite longitudinal ends of the YIG monocrystal 22. The microwave input terminal 26 is connected to one end of the microstrip 24, and the microwave output terminal 28 is connected to the other end of the microstrip 24. The microwave input terminal 26 is connected to an output terminal of an unillustrated microwave oscillator that generates microwaves of a GHz band. The microwave output terminal 28 is connected to an oscilloscope OS via an unillustrated detector, so as to enable observation of output from the microwave output terminal 28.

Further, an unillustrated permanent magnet is disposed in the vicinity of the YIG monocrystal 22. The permanent magnet applies a weak DC magnetic field H onto the main face of the YIG monocrystal 22 in a direction perpendicular thereto.

A semiconductor laser 30, a first lens 32, and a polarizer 34 are disposed on the outside of one side surface of the YIG monocrystal 22 with respect to the widthwise direction thereof, such that they are arranged in the given sequence in the direction toward the YIG monocrystal 22. The semiconductor laser 30 generates a laser beam having a wavelength of, for example, 1.3 μm. The first lens 32 focuses the laser beam at a point within the YIG monocrystal 22. The polarizer 34 polarizes the light beam linearly to obtain linearly polarized light.

A analyzer 36, a second lens 38, and a photo detector 40 are disposed on the outside of the other side surface of the YIG monocrystal 22 with respect to the widthwise direction thereof such that they are arranged in the given sequence in the direction away from the YIG monocrystal 22. The analyzer 36 allows passage of light which is contained in the laser beam output from the YIG monocrystal 22 and which is linearly polarized in a specific direction. The analyzer 36 is disposed in a cross Nicol relationship with the polarizer 34; i.e., the polarization direction of the analyzer 36 is substantially perpendicular to the polarization direction of the polarizer 34. The second lens 38 focuses the laser beam passed through the analyzer 36. The photo detector 40 detects the laser beam focused by the second lens 38. The photo detector 40 is formed of, for example, a Ge photodiode. The output terminal of the photo detector 40 is connected to the oscilloscope OS so as to enable observation of the output from the photo detector 40.

In a microstrip such as the microstrip 24 shown in FIG. 1, microwaves and magnetostatic waves are known to propagate in parallel to the microstrip (see Tsutsumi, et al., IEICE Transactions, J76-C-1, 34, 1996). Therefore, in the optical signal processing apparatus 20 shown in FIG. 1, when microwaves having a frequency within the GHz band are input to the microwave input terminal 26, microwaves output from the microwave output terminal 28 are observed. When the laser beam generated by the semiconductor laser 30 is caused to propagate through the YIG monocrystal 22 via the first lens 32 and the polarizer 34 in this state, the optical signal that has propagated through the analyzer 34 and the second lens 38 is detected by the photo detector 40 as being modulated by the microwaves. FIG. 1 provides a conceptual depiction of the waveform of the microwave input to the microwave input terminal 26, the waveform of the microwave output from the microwave output terminal 28, the waveform of the laser beam generated by the semiconductor laser 30, the waveform of the optical signal detected by the photo detector 40, and the waveform of a signal output from the photo detector 40. The optical signal processing apparatus 20 can modulate optical signals by use of microwaves at an efficiency of about 1%, which is about 10 to 100 times that achieved by conventional techniques. This high efficiency is conceivably obtained through the following mechanism.

In the optical signal processing apparatus 20 shown in FIG. 1, in addition to a DC magnetic field H generated by the permanent magnet, a high-frequency magnetic field is generated within the YIG monocrystal 22 by the microwaves input to the microwave input terminal 26. Since the DC magnetic field H generated by the permanent magnet is not sufficiently strong such that magnetic saturation occurs in the YIG monocrystal 22, magnetic domain walls are present within the YIG monocrystal 22. The magnetic domain walls are considered to vibrate due to the high-frequency magnetic field generated by microwaves.

Incidentally, it is generally known that when an internal magnetic field is generated in an optical medium, the plane of polarization of light waves propagating within the medium is rotated. This phenomenon is known as magneto-optical effect, and examples thereof include the Faraday effect (an effect that occurs when the propagation direction of light and the internal magnetic field are parallel to each other) and the Cotton-Moutton effect (an effect that occurs when the propagation direction of light and the internal magnetic field are perpendicular to each other).

Accordingly, in the optical signal processing apparatus 20 shown in FIG. 1, in addition to a static magneto-optical effect caused by the DC magnetic field H, there occurs a dynamic magneto-optical effect caused by the high-frequency magnetic field or vibration of the magnetic domain walls. Further, although only linearly polarized light of a certain polarization direction reaches the photo detector 40 via the analyzer 36, the linearly polarized component vibrates at the microwave frequency, because of the above-described dynamic magneto-optical effect. That is, a signal of the microwave band is copied to the light beam in the form of a variation in the envelope of Intensity thereof. Although the photo detector 40 cannot at all follow variations in light intensity at the frequency of light, it can follow variations in light intensity in the microwave band (the envelope of the light intensity). Consequently, the optical signal is modulated by the microwaves. The variation in the envelope of intensity of the thus-modulated optical signal is then converted into an electric signal in the microwave band for observation.

Since the magnetic domain walls are expected to be vibrated efficiently due to the structure of the microstrip 24, the efficiency in modulating the optical signal by microwaves is considered to increase.

In the optical signal processing apparatus 20 shown in FIG. 1, instead of the permanent magnet, an electromagnet may be used as a source for generating a weak DC magnetic field H. Further, the first lens 32 and the polarizer 34 may exchange positions. Similarly, the analyzer 36 and the second lens 38 may exchange positions. The polarizer 34 and the analyzer 36 are not required to be disposed in a cross Nicol relationship. Further, instead of a photodiode such as a Ge photodiode, the photo detector may assume the form of a phototransistor, a photoelectric tube, a photo multiplier, or the like. This is also the case with other optical signal processing apparatuses described later.

Figure 2:
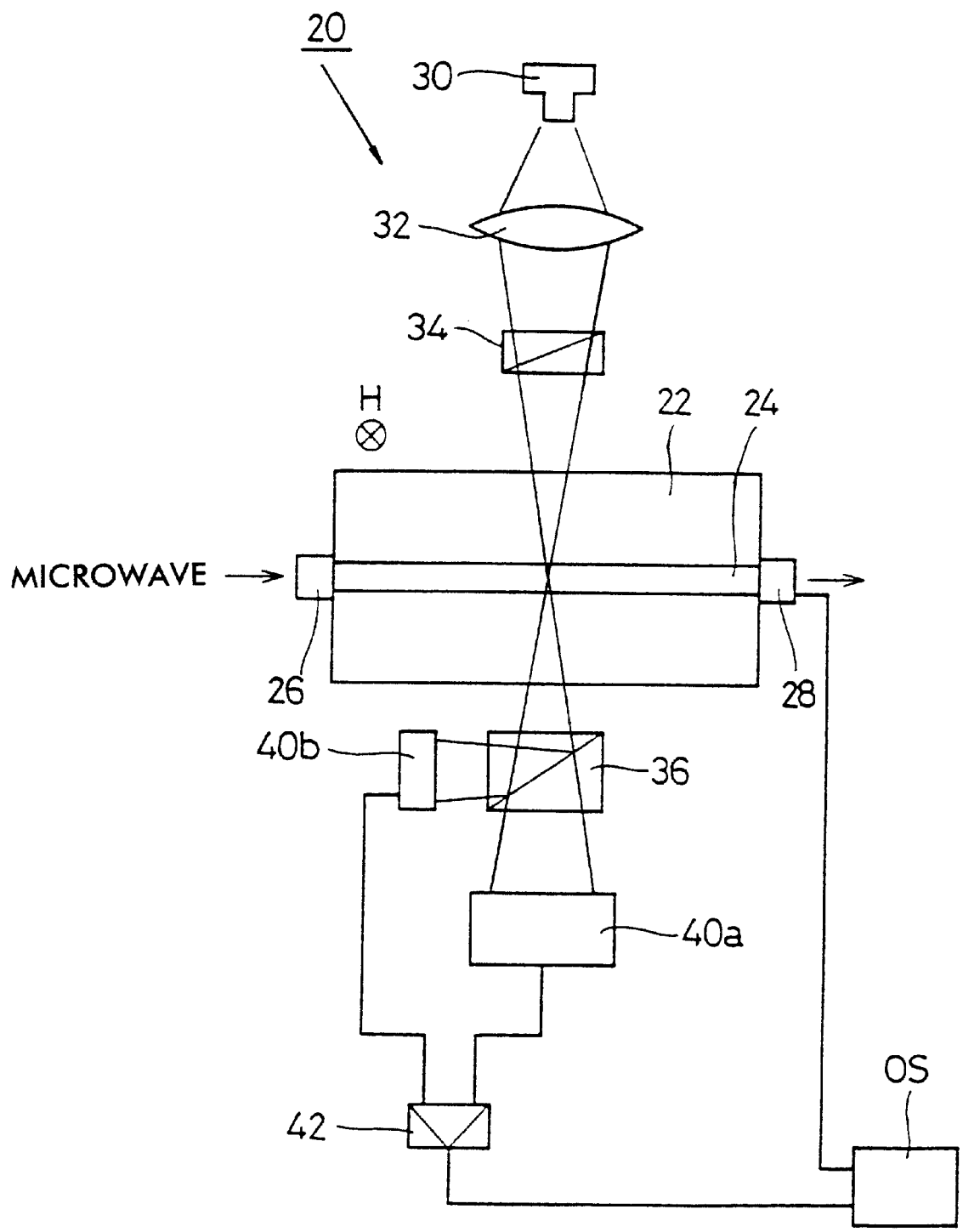
FIG. 2 is a schematic view of an optical signal processing apparatus according to a second embodiment of the present invention.

FIG. 2 is a schematic view of an optical signal processing apparatus according to a second embodiment of the present invention. The optical signal processing apparatus shown in FIG. 2 differs from the optical signal processing apparatus shown in FIG. 1 in that a polarization prism is used as the analyzer 36. In this case, the analyzer 36 is disposed such that an angular difference of 45° is produced between the polarization direction of an optical signal that passes through the analyzer 36 and the polarization direction of an optical signal that is reflected onto the analyzer 36. Further, a first photo detector 40a and a second photo detector 40b each formed of a Ge photo diode are provided in the vicinity of the analyzer 36. The first photo detector 40a detects the optical signal that passes through the analyzer 36, and the second photo detector 40b detects the optical signal that is reflected onto the analyzer 36. The output terminals of the first and second photo detectors 40a and 40b are connected to the two input terminals of an operation circuit 42. When the output of the first photo detector 40a is taken as A and the output of the second photo detector 40b as B, the operation circuit 42 performs operation in accordance with the formula (A−B)/(A+B). The output terminal of the operation circuit 42 is connected to the oscilloscope OS in order to enable observation of the signal from the output terminal of the operation circuit 42.

Like the optical signal processing apparatus of FIG. 1, the optical signal processing apparatus of FIG. 2 can modulate optical signals by use of microwaves at an efficiency of about 1%, which is about 10 to 100 times that achieved by conventional techniques.

Further, in the optical signal processing apparatus of FIG. 2, when the strength of the magneto-optical effect is as small as a few degrees or less, it can be obtained with a high degree of accuracy through utilization of the output (A−B)/(A+B) of the operation circuit 42. This is known as the 45-degree method. Therefore, the modulation of the optical signal can be detected with a further improved SN ratio.

Next, there will be described the filter characteristics of the optical signal processing apparatus 20 shown in FIG. 1. In order to determine the filter characteristics, the signal from the microwave output terminal 28 and the signal output from the photo detector 40 are observed while the frequency of the microwaves input to the microwave input terminal 26 is swept or changed within the GHz band.

Figure 3:
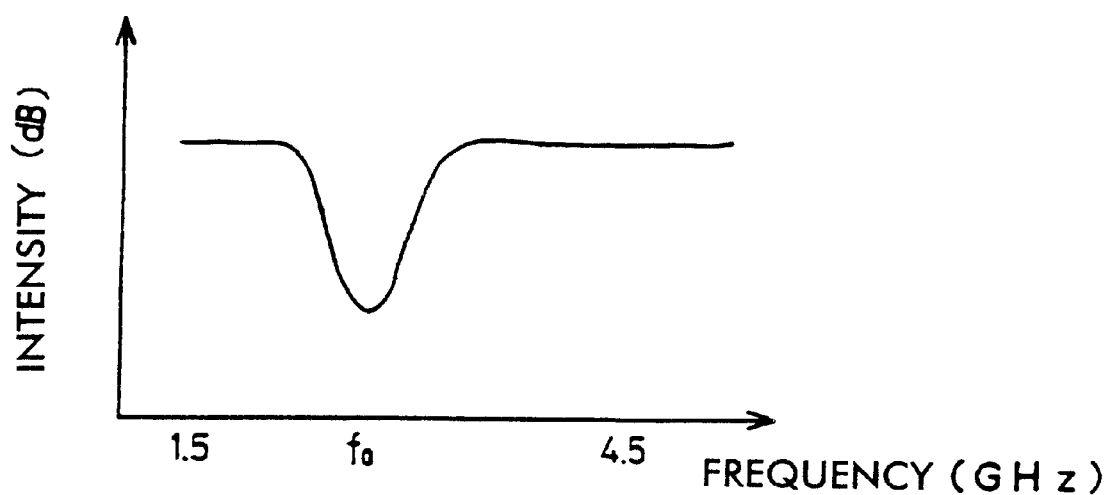
FIG. 3 is a graph showing a filter characteristic measured at a microwave output terminal of the optical signal processing apparatus shown in FIG. 1.

In the optical signal processing apparatus 20 shown in FIG. 1, a DC magnetic field H generated by a permanent magnet is applied. Therefore, when the frequency of the microwaves is swept, a magnetostatic wave is excited in the YIG monocrystal 22 at a magnetostatic-wave resonant frequency $f_0$. Therefore, at the frequency $f_0$, the signal strength of microwaves output from the microwave output terminal 28 decreases (see FIG. 3). That is, the YIG monocrystal 22 and the microstrip 24 provide a bandpass filter characteristic.

Figure 4:
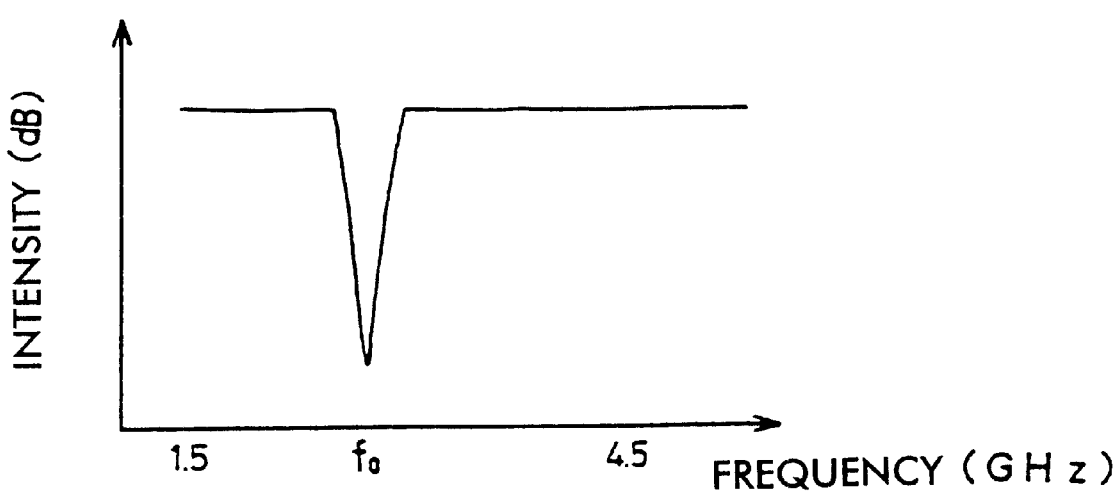
FIG. 4 is a graph showing a filter characteristic measured at an output terminal of a photo detector of the optical signal processing apparatus shown in FIG. 1.

When the optical signal output from the photo detector 40 is observed, its strength is found to reach a minimum at the frequency $f_0$, at which the signal from the microwave output terminal 28 decreases (see FIG. 4). However, as compared with an attenuation curve obtained from the signal from the microwave output terminal 28, an attenuation curve obtained from the output from the photo detector 40 has a narrow half-value width and indicates that a greater degree of attenuation is obtained. This is conceivably because microwaves can modulate optical signals more effectively than can magnetostatic waves.

Accordingly, when the optical signal processing apparatus 20 shown in FIG. 1 is operated as a bandpass filter in a state in which the optical output from the photo detector 40 is utilized, a higher Q value is obtained compared to the case where the signal from the microwave output terminal 28 is utilized. Thus, a filter characteristic having a narrower bandwidth can be obtained.

Figure 5:
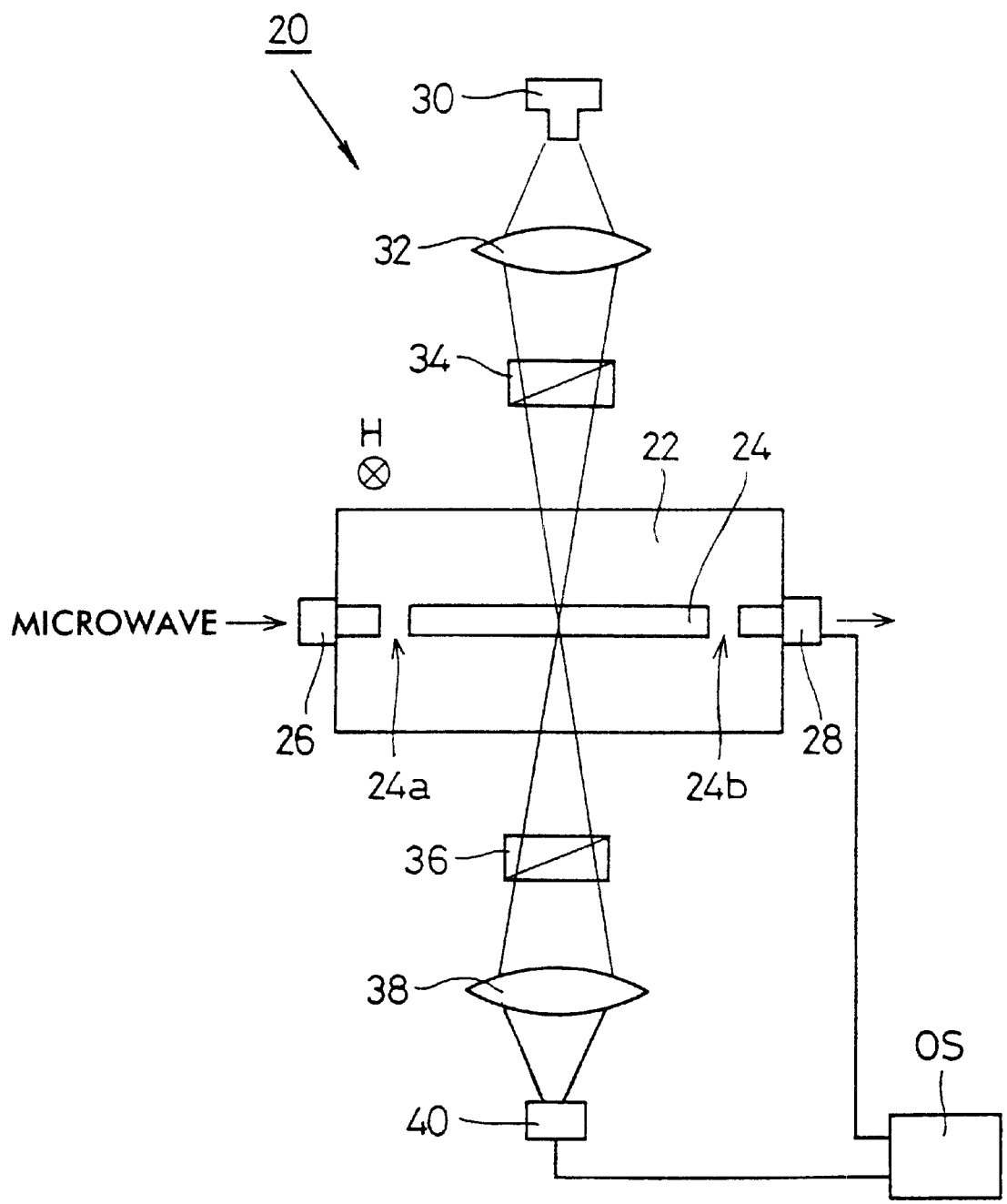
FIG. 5 is a schematic view of an optical signal processing apparatus according to a third embodiment of the present invention.

FIG. 5 is a schematic view of an optical signal processing apparatus according to a third embodiment of the present invention. The optical signal processing apparatus shown in FIG. 5 differs from the optical signal processing apparatus shown in FIG. 1 in that two air gaps 24a and 24b are formed in the vicinity of opposite longitudinal ends of the microstrip 24.

Figure 6:
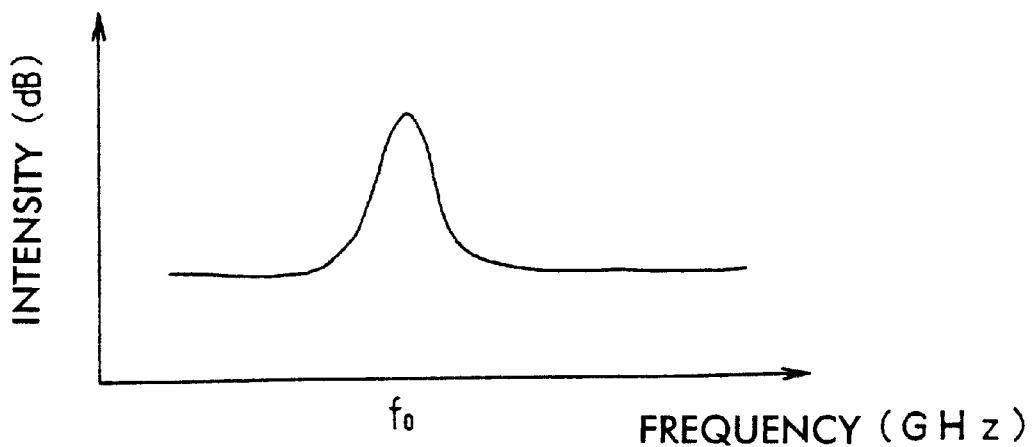
FIG. 6 is a graph showing a filter characteristic measured at a microwave output terminal of the optical signal processing apparatus shown in FIG. 5.
Figure 7:
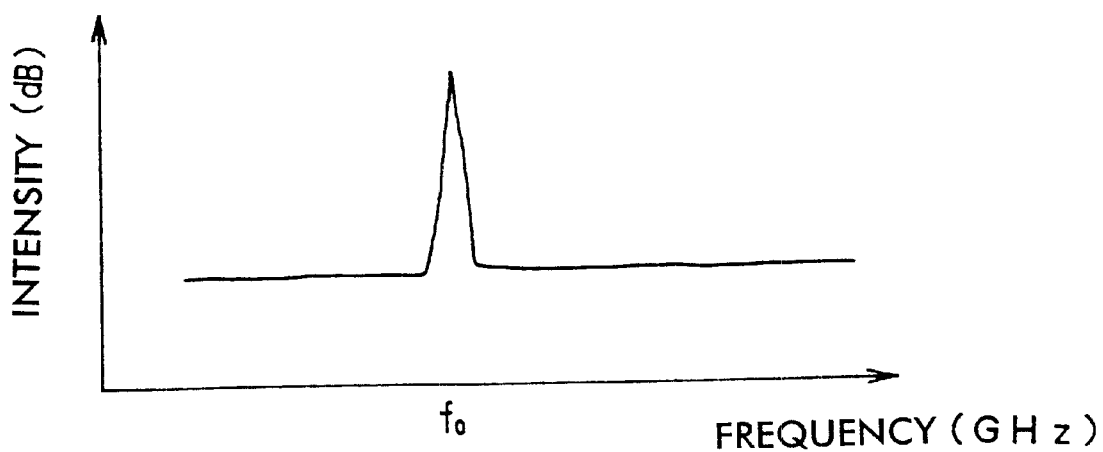
FIG. 7 is a graph showing a filter characteristic measured at an output terminal of a photo detector of the optical signal processing apparatus shown in FIG. 5.

In the optical signal processing apparatus 20 shown in FIG. 5, since the two air gaps 24a and 24b are formed in the microstrip 24, a half-wavelength resonator for microwaves is formed. Therefore, a filter characteristic determined on the basis of the signal from the microwave output terminal 28 becomes a bandpass filter characteristic that allows passage of microwaves of the resonant frequency $f_0$ of the microstrip 24 (see FIG. 6). Further, since non-linearity is present in the efficiency of modulation of light by microwaves, the filter characteristic determined on the basis of the output from the photo detector 40 (see FIG. 7) becomes sharper than the filter characteristic determined on the basis of the signal from the microwave output terminal 28 shown in FIG. 6, so that an improved resonance characteristic is obtained.

Therefore, when the optical signal processing apparatus 20 shown in FIG. 5 is operated as a bandpass filter in a state in which the optical output from the photo detector 40 is utilized, a higher Q value is obtained compared to the case where the signal from the microwave output terminal 28 is utilized. Thus, filter characteristic having a narrower bandwith can be obtained. Further, a narrow band oscillator can be constructed from the bandpass filter.

Figure 8:
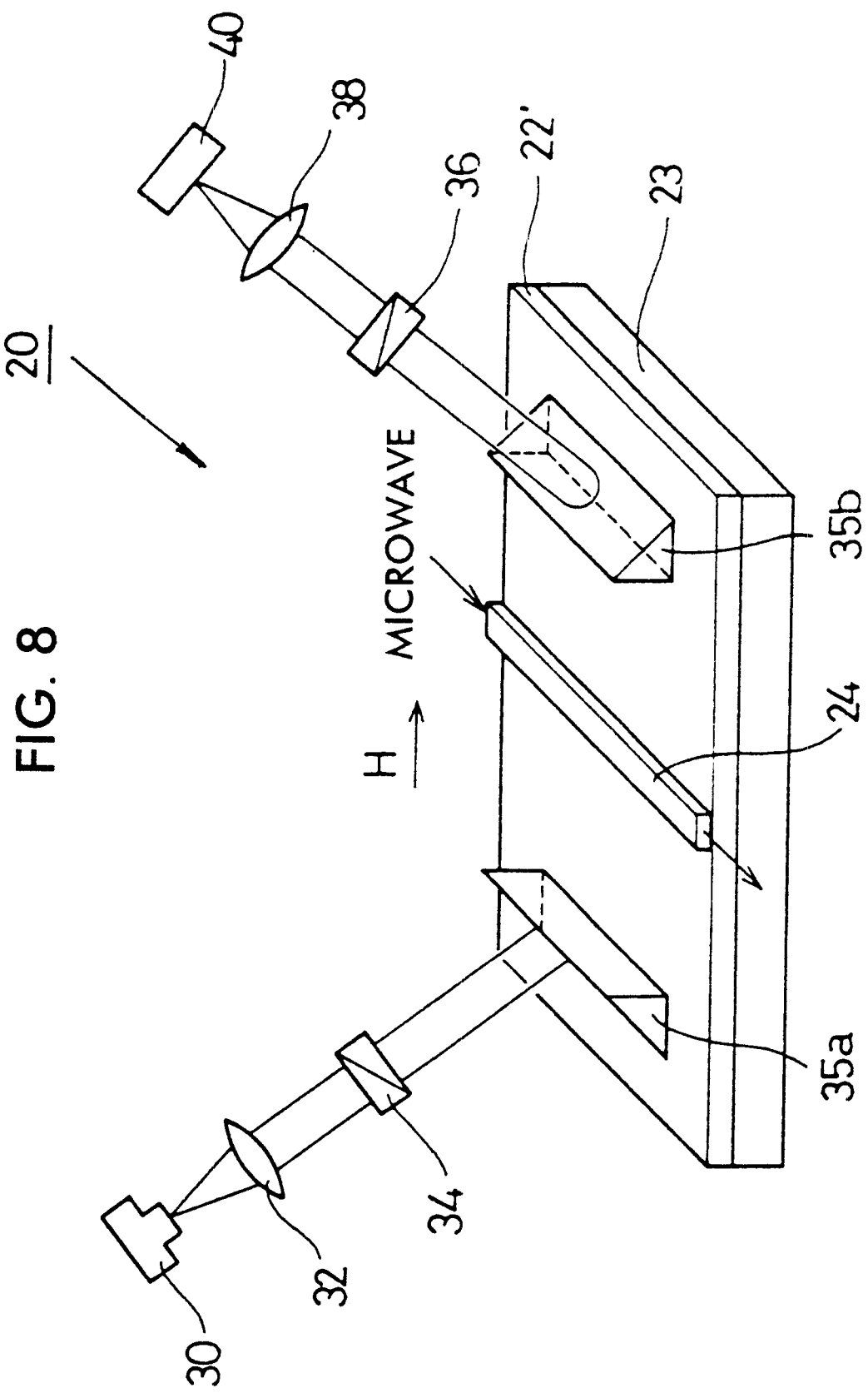
FIG. 8 is a schematic view of an optical signal processing apparatus according to a fourth embodiment of the present invention.

FIG. 8 is a schematic view of an optical signal processing apparatus according to a fourth embodiment of the present invention. The optical processing apparatus as shown in FIG. 8 notably differs from the optical signal processing apparatus shown in FIG. 1 in that a YIG monochrystalline thin film 22' having a film thickness of 10 $\mu$m is used as a magnetic body. The YIG monochrystalline thin film 22' is formed on a GGG substrate 23 through LPE (liquid phase epitaxy). Further, a first rutile prism 35a and a second rutile prism 35b are provided on the opposite sides of the microstrip 24. A semiconductor laser 30, a first lens 32, and a polarizer are disposed such that a laser beam generated by the semiconductor laser 30 is radiated onto the first rutile prism 35a serving as a prism coupling, via the first lens 32 and the polarizer 34, and is then introduced into the YIG monocrystalline thin film 22'. Further, a analyzer 36, a second lens 38, and a photo detector 40 are disposed such that a laser beam exiting from the YIG monocrystalline thin film 22' to free space via the second rutile prism 35b is detected by the photo detector 40 via the second lens 38.

In the optical signal processing apparatus shown in FIG. 8, the laser beam generated by the semiconductor laser 30 is radiated onto the polarizer 34 via the first lens 32 in order to be polarized. By use of the first rutile prism 35a serving as a prism coupling, the polarized beam is then guided into the YIG monocrystalline thin film 22'. In this state, microwaves of the GHz band are input to the microstrip 24, which is substantially perpendicular to the propagation direction of the laser beam within the YIG monocrystalline thin film 22'. Further, by use of an unillustrated permanent magnet, a weak DC magnetic field H is applied to the YIG monocrystalline thin film 22' in a direction substantially parallel to the propagation direction of the laser beam within the YIG monocrystalline thin film 22'. Thus, the plane of polarization of light within the YIG monocrystalline thin film 22' is rotated by a magneto-optical effect induced by microwaves or the like. Subsequently, the second rutile prism 35b causes the laser beam to propagate into free space. The polarization direction of the laser beam is confirmed through use of the analyzer 36, the second lens 38, and the photo detector 40.

In the optical signal processing apparatus shown in FIG. 8, light propagates in a certain mode within the YIG monocrystalline thin film 22', unlike in the case of propagating within a bulk such as a YIG monocrystal. When light of a quasi-TM mode is introduced into the YIG monocrystalline thin film 22', the plane of polarization of light is rotated due to the magneto-optical effect induced by microwaves, and the quasi-TM mode light is output from the YIG monocrystalline thin film 22' after being converted into TE-mode light.

Therefore, the optical signal processing apparatus shown in FIG. 8 can convert a TM-mode light signal into a TE-mode light signal more effectively than can be realized by conventional techniques.

In the optical signal processing apparatus shown in FIG. 8, instead of the prism coupling, an edge coupling for inputting a light beam into the YIG monocrystalline thin film 22' from its end surface may be used as means for introducing light into the YIG monocrystalline thin film 22'.

Figure 9:
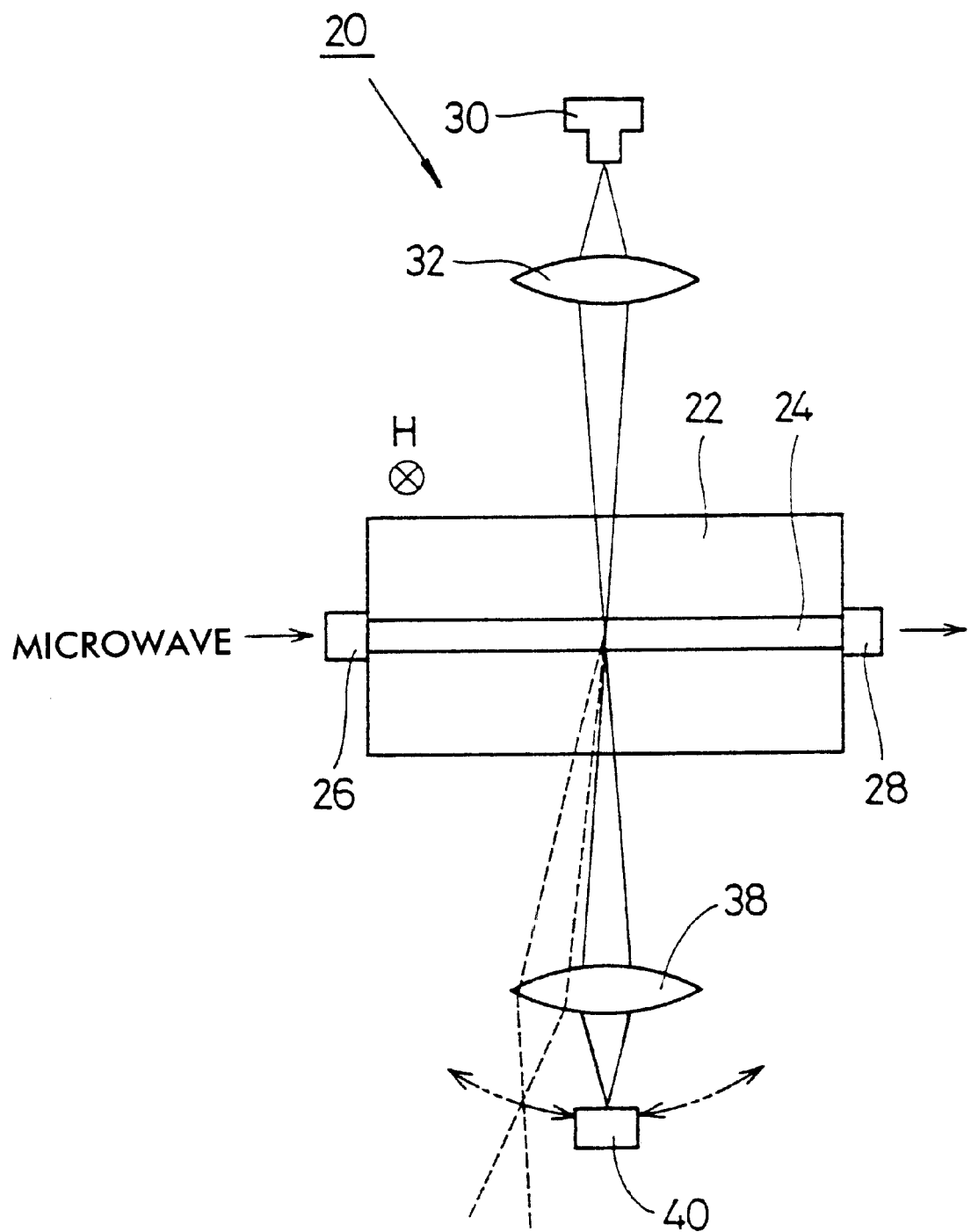
FIG. 9 is a schematic view of an optical signal processing apparatus according to a fifth embodiment of the present invention.
Figure 10:
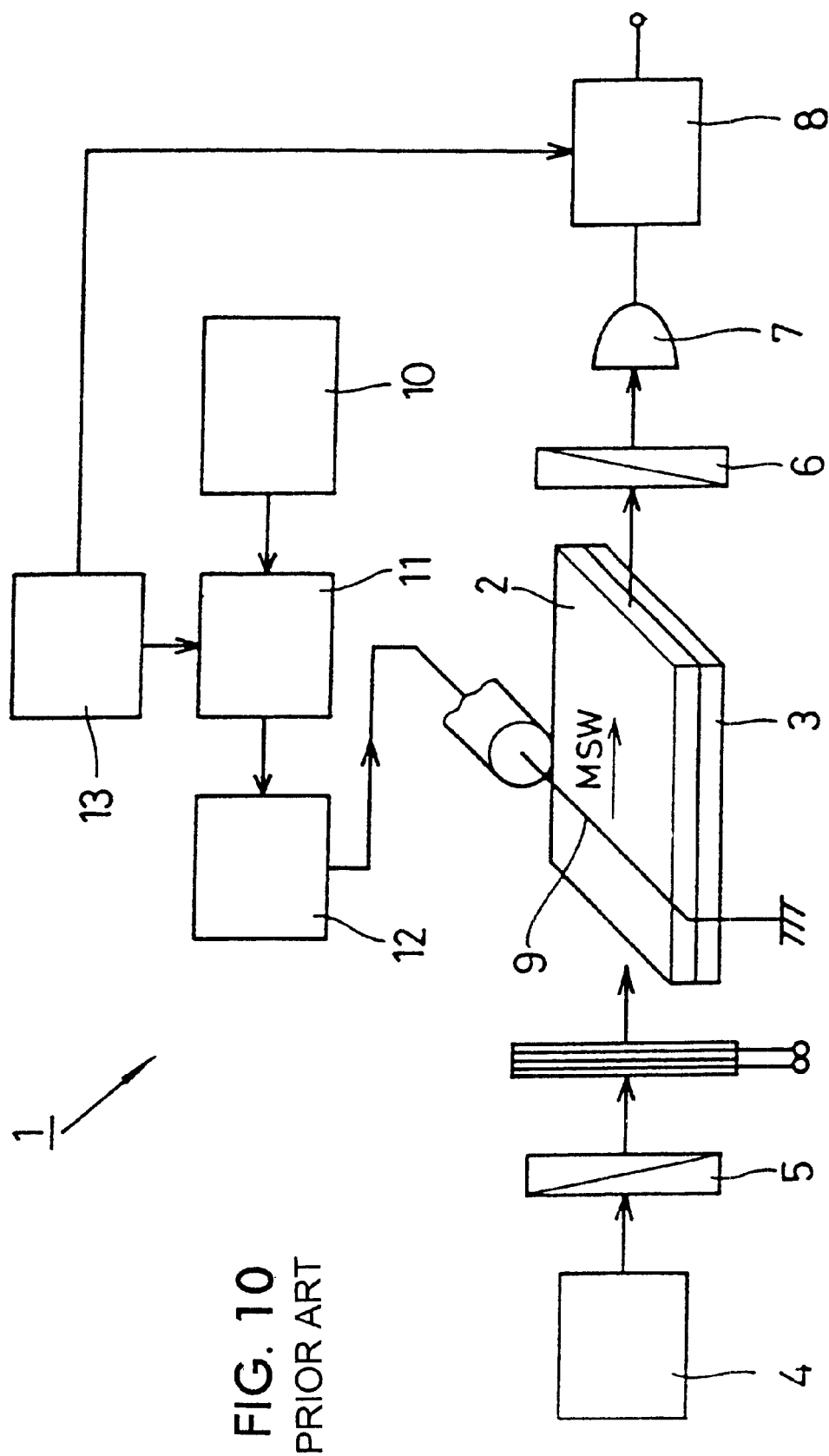
FIG. 10 is a schematic view of a conventional optical signal processing apparatus.
Figure 11:
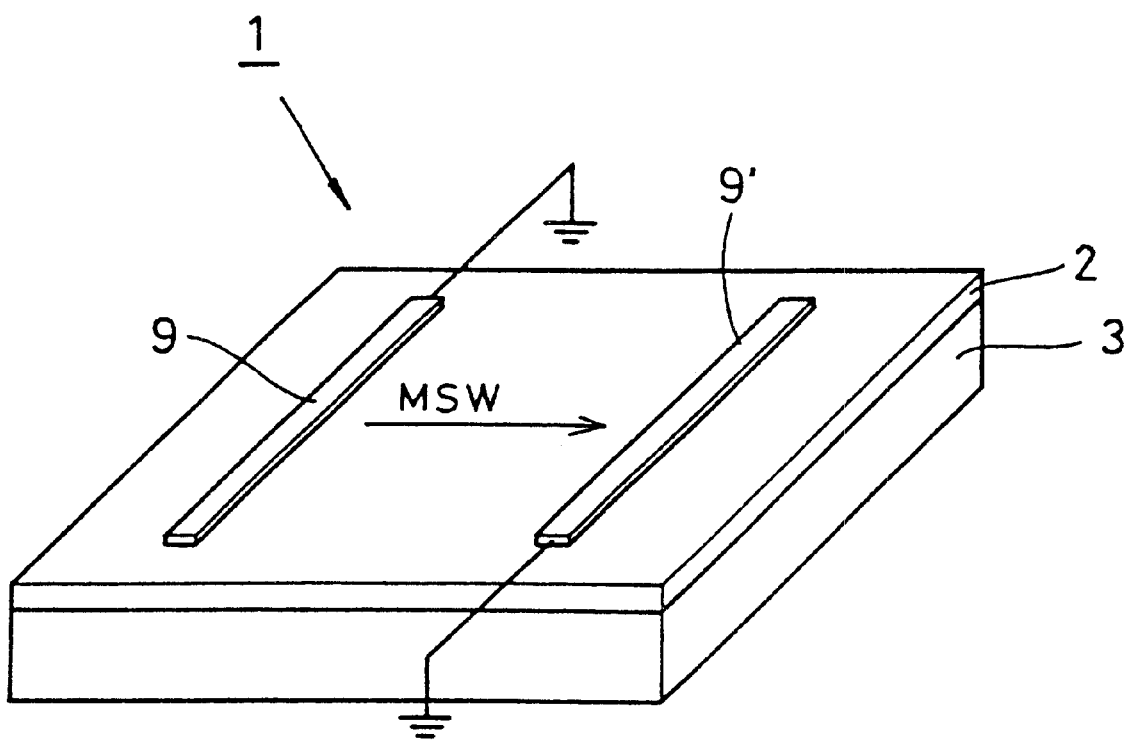
FIG. 11 is a schematic view of another conventional optical signal processing apparatus.

FIG. 9 is a schematic view of an optical signal processing apparatus according to a fifth embodiment of the present invention. The optical signal processing apparatus shown in FIG. 9 notably differs from the optical signal processing apparatus shown in FIG. 1 in that a photo detector 40 is provided to be movable. In the optical signal processing apparatus shown in FIG. 9, microwaves of the GHz band are input to a microstrip 24. Further, a laser beam generated by a semiconductor laser 30 and having a wavelength of 1.3 $\mu$m is input into the YIG monocrystal 22 from the end surface thereof, via a first lens 32 along a direction substantially perpendicular to the microstrip 24. Further, a weak DC magnetic field H generated by a permanent magnet is applied to the YIG monocrystal 22 along a direction perpendicular to the microstrip 24 and the propagation direction of light. The optical detector 40 is moved on the side of the YIG monocrystal 22 to which the light beam is output, so that the deflection angle of the light beam passing through the YIG monocrystal 22 can be measured via the second lens 38.

As in the optical signal processing apparatus shown in FIG. 1, in the optical signal processing apparatus shown in FIG. 9, microwaves conceivably cause magnetic domain walls within the YIG monocrystal 22 to vibrate at the frequency of the microwaves. Due to this vibration of magnetic domain walls, presumably the spatial distribution of refraction coefficient changes periodically. Therefore, light propagating within the YIG monocrystal 22 is subjected to a diffraction effect, so that a light beam is bent. Therefore, in the optical signal processing apparatus shown in FIG. 9, the propagation direction of a light beam is changed; i.e., a scanning operation can be effected. Further, the deflection angle of the light beam can be increased as compared with the case of conventional AO modulators.

Next, there will be described detection of surge current by the optical signal processing apparatus 20 shown in FIG. 1. In an optical signal processing apparatus having a microstrip structure such as the optical signal processing apparatus 20 shown in FIG. 1, a light beam can conceivably be modulated with high sensitivity and at high speed not only by magnetostatic waves but also by microwaves. Therefore, surge current stemming from lightning or the like can be detected through employment of a structure in which, when high-speed surge current is generated due to lightning or the like, the surge current is input to the microwave input terminal 26 of the optical signal processing apparatus 20 shown in FIG. 1. In this case, the light beam follows the surge current at a sufficiently high speed, so that the optical output detected by the photo sensor 40 changes. The surge current can be detected on the basis of this change. Accordingly, the optical signal processing apparatus shown in FIG. 1 can detect surge current stemming from lightening or the like at a higher speed than can be realized by conventional techniques.

What is claimed is:

1. An optical signal processing apparatus in which a microwave signal is applied to a strip line formed transversely to a general propagation direction on a magnetic body, in order to process an optical signal propagating through said magnetic body in said general propagation direction;

wherein a magnetic field is applied to said magnetic body; and wherein said general propagation direction of the optical signal within said magnetic body, the propagation direction of the microwave signal, and the application direction of the magnetic field are substantially perpendicular to one another.

2. An optical signal processing apparatus according to claim 1, wherein said magnetic body is formed of a ferrite.

3. An optical signal processing apparatus according to claim 2, wherein said ferrite is an iron garnet.

4. An optical signal processing apparatus according to claim 3, wherein said iron garnet is YIG (yttrium iron garnet).

5. An optical signal processing apparatus according to claim 1, wherein said magnetic body is formed of a bulk monocrystal.

6. A TM-TE mode converter using the optical signal processing apparatus according to claim 1.

7. A filter comprising the optical signal processing apparatus according to claim 1 and a photo detector.

8. A filter according to claim 7, wherein said photodetector is movable with said magnetic body.

9. A filter according to claim 7, wherein said photo detector is selected from the group consisting of a photodiode, a phototransistor, a photoelectric tube, and a photo multiplier.

10. An optical signal processing apparatus according to claim 1, wherein said magnetic body is formed of a monocrystalline thin film.

11. An optical beam scanner using the optical signal processing apparatus according to claim 1.

12. An electromagnetic field sensor using the optical signal processing apparatus according to claim 1.

13. An optical signal processing apparatus according to claim 1, wherein the application direction of the magnetic field is substantially perpendicular to said strip line.

14. An optical signal processing method in which a microwave signal is applied to a strip line formed transversely to a general propagation direction on a magnetic body in order to process an optical signal propagating through the magnetic body in said general propagation direction;

wherein a magnetic field is applied to said magnetic body; and wherein said general propagation direction of the optical signal within said magnetic body, the propagation direction of the microwave signal, and the application direction of the magnetic field are substantially perpendicular to one another.

15. An optical signal processing method according to claim 14, wherein said magnetic body is formed of a ferrite.

16. An optical signal processing method according to claim 15, wherein said ferrite is an iron garnet.

17. An optical signal processing method according to claim 16, wherein said iron garnet is YIG (yttrium iron garnet).

18. An optical signal processing method according to claim 14, wherein the application direction of the magnetic field is substantially perpendicular to said strip line.

19. An optical signal processing apparatus in which a microwave signal is applied to a strip line formed on a magnetic body, in order to process an optical signal propagating through said magnetic body; and in which a photodetector receives said optical signal;

wherein said photo detector is selected from the group consisting of a phototransistor a photoelectric tube, and a photo multiplier;

wherein a magnetic field is applied to said magnetic body; and wherein the strip line is formed transversely to a general propagation direction of the optical signal and said general propagation direction of the optical signal within said magnetic body, the propagation direction of the microwave signal, and the application direction of the magnetic field are substantially perpendicular to one another.

20. An optical signal processing apparatus according to claim 19, wherein said photodetector is movable with respect to said magnetic body.

21. An optical signal processing apparatus according to claim 19, wherein the application direction of the magnetic field is substantially perpendicular to said strip line.

22. An optical signal processing apparatus in which a microwave signal is applied to a resonant strip line formed on a magnetic body in order to process an optical signal propagating through said magnetic body;

wherein a magnetic field is applied to said magnetic body; and wherein the strip line is formed transversely to a general propagation direction of the optical signal and said general propagation direction of the optical signal within said magnetic body, the propagation direction of the microwave signal, and the application direction of the magnetic field are substantially perpendicular to one another.

23. An optical signal processing apparatus according to claim 22, wherein said resonant strip line has a length related to a wavelength of said microwave signal.

24. An optical signal processing apparatus according to claim 23, wherein said length is half of the wavelength of said microwave signal.

25. An optical signal processing apparatus according to claim 23, wherein said length is defined by a pair of air gaps formed in said strip line.

26. An optical signal processing apparatus according to claim 25, wherein said length is half of the wavelength of said microwave signal.

27. An optical signal processing apparatus according to claim 24, wherein the application direction of the magnetic field is substantially perpendicular to said strip line.

* * * * *